United States Patent
Li et al.

(10) Patent No.: US 8,837,614 B2
(45) Date of Patent: Sep. 16, 2014

(54) PILOT-BASED TIME OFFSET ESTIMATION APPARATUS AND METHOD

(75) Inventors: Ping Li, Shenzhen (CN); Hongfeng Qin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/259,606

(22) PCT Filed: May 19, 2010

(86) PCT No.: PCT/CN2010/072926
§ 371 (c)(1),
(2), (4) Date: Sep. 23, 2011

(87) PCT Pub. No.: WO2011/000244
PCT Pub. Date: Jan. 6, 2011

(65) Prior Publication Data
US 2012/0099631 A1    Apr. 26, 2012

(30) Foreign Application Priority Data
Jul. 3, 2009   (CN) .......................... 2009 1 0151594

(51) Int. Cl.
*H04L 27/26* (2006.01)
*H04L 25/02* (2006.01)

(52) U.S. Cl.
CPC .......... *H04L 27/2656* (2013.01); *H04L 25/022* (2013.01); *H04L 27/2695* (2013.01); *H04L 27/2662* (2013.01); *H04L 25/0224* (2013.01)
USPC ........................................................ 375/260

(58) Field of Classification Search
CPC ........................ H04L 27/2657; H04L 27/2656
USPC .................... 375/260, 208, 285, 286
See application file for complete search history.

(56) References Cited

U.S. PATENT DOCUMENTS 5,625,646 A * 4/1997 Goodson et al. .............. 375/285
5,815,529 A * 9/1998 Wang ............................ 375/285

(Continued)

FOREIGN PATENT DOCUMENTS

CN         1917397      2/2007
CN       101267422      9/2008

(Continued)

OTHER PUBLICATIONS

Il-Gu Lee et al., "High Accuracy and Low Complexity Timing Off High Accuracy and Low Complexity Timing Offset Estimation for MIMO-OFDM Receivers", IEEE WCNC 2006 proceedings.*

(Continued)

*Primary Examiner* — Daniel Wasburn
*Assistant Examiner* — Berhanu Tadese
(74) *Attorney, Agent, or Firm* — Jenkins, Wilson, Taylor & Hunt, P.A.

(57) ABSTRACT

The present invention provides a pilot-based timing offset estimation apparatus and method. The timing offset estimation apparatus includes: a pilot bit channel estimation module, configured to acquire pilot bit frequency-domain channel estimation values of target users through calculation on respective sub-carriers of the target users according to received frequency-domain demodulation reference symbols and local frequency-domain demodulation reference symbols; and a timing offset estimation module, configured to respectively perform timing offset estimation for each target user by using phase differences among the pilot bit frequency-domain channel estimation values on the respective sub-carriers. The present invention performs timing offset estimation for multiple users on the basis of the received pilot sequences, therefore provides more accurate measurement values for timing offset compensation and timing offset reporting, so as to reduce the influence of the timing offset on the receiver performance.

9 Claims, 3 Drawing Sheets

(56) References Cited

U.S. PATENT DOCUMENTS

| | | | |
|---|---|---|---|
| 5,956,624 A * | 9/1999 | Hunsinger et al. | 455/65 |
| 6,522,702 B1 * | 2/2003 | Maruyama | 375/324 |
| 6,647,071 B2 * | 11/2003 | Sommer et al. | 375/285 |
| 6,831,954 B1 * | 12/2004 | Mandyam | 375/286 |
| 6,996,164 B1 * | 2/2006 | Blount et al. | 375/219 |
| 6,996,199 B2 * | 2/2006 | Storm et al. | 375/350 |
| 7,079,607 B2 * | 7/2006 | Brunel | 375/346 |
| 7,251,283 B2 * | 7/2007 | Chen | 375/260 |
| 7,418,248 B2 * | 8/2008 | Maeda et al. | 455/203 |
| 7,469,491 B2 * | 12/2008 | McCallister et al. | 375/296 |
| 8,031,787 B2 * | 10/2011 | Fechtel et al. | 375/260 |
| 8,045,633 B2 * | 10/2011 | Baggen et al. | 375/260 |
| 8,165,249 B2 * | 4/2012 | Li et al. | 375/344 |
| 8,290,098 B2 * | 10/2012 | Onggosanusi et al. | 375/346 |
| 2002/0126618 A1 * | 9/2002 | Kim | 370/208 |
| 2004/0081205 A1 * | 4/2004 | Coulson | 370/503 |
| 2004/0264561 A1 * | 12/2004 | Alexander et al. | 375/232 |
| 2004/0264587 A1 * | 12/2004 | Morejon et al. | 375/260 |
| 2005/0084025 A1 * | 4/2005 | Chen | 375/260 |
| 2005/0111538 A1 * | 5/2005 | Wernaers | 375/229 |
| 2005/0157801 A1 * | 7/2005 | Gore et al. | 375/260 |
| 2005/0286665 A1 * | 12/2005 | Resheff et al. | 375/350 |
| 2006/0159188 A1 * | 7/2006 | Izumi | 375/260 |
| 2006/0165128 A1 * | 7/2006 | Peake et al. | 370/503 |
| 2006/0176802 A1 * | 8/2006 | Ko et al. | 370/208 |
| 2007/0025476 A1 * | 2/2007 | Rasmussen et al. | 375/343 |
| 2007/0070968 A1 * | 3/2007 | Kawasaki | 370/344 |
| 2007/0071069 A1 * | 3/2007 | Miller | 375/146 |
| 2007/0116162 A1 * | 5/2007 | Eliaz et al. | 375/350 |
| 2007/0165699 A1 * | 7/2007 | Dabak et al. | 375/146 |
| 2007/0183519 A1 * | 8/2007 | Dang | 375/260 |
| 2008/0112386 A1 * | 5/2008 | Ogawa et al. | 370/345 |
| 2008/0130771 A1 * | 6/2008 | Fechtel et al. | 375/260 |
| 2008/0130813 A1 * | 6/2008 | Hwang et al. | 375/371 |
| 2008/0273621 A1 * | 11/2008 | Manakkal et al. | 375/267 |
| 2008/0317150 A1 * | 12/2008 | Alexander et al. | 375/260 |
| 2009/0010149 A1 * | 1/2009 | Lee et al. | 370/208 |
| 2009/0016465 A1 * | 1/2009 | Ramesh | 375/324 |
| 2009/0052561 A1 * | 2/2009 | Baxley et al. | 375/260 |
| 2009/0086841 A1 * | 4/2009 | Guo et al. | 375/267 |
| 2009/0092038 A1 * | 4/2009 | Mujtaba et al. | 370/208 |
| 2009/0103666 A1 * | 4/2009 | Zhao et al. | 375/341 |
| 2009/0129492 A1 * | 5/2009 | Hamaguchi et al. | 375/260 |
| 2010/0008216 A1 * | 1/2010 | Li et al. | 370/208 |
| 2010/0150257 A1 * | 6/2010 | Lee et al. | 375/260 |
| 2010/0159837 A1 * | 6/2010 | Dent et al. | 455/63.1 |
| 2010/0246564 A1 * | 9/2010 | Vrcelj et al. | 370/350 |

FOREIGN PATENT DOCUMENTS

| | | |
|---|---|---|
| JP | 2007-088719 A | 4/2007 |
| JP | 2009-124301 A | 6/2009 |
| JP | 2009-124305 A | 6/2009 |
| JP | 2009-130702 A1 | 6/2009 |
| KR | 10-2008-0041008 | 5/2008 |
| WO | WO 2007/020943 A1 | 2/2007 |
| WO | WO 2007/139026 A1 | 12/2007 |
| WO | WO-2008/026891 | 3/2008 |
| WO | WO 2008/083399 A2 | 7/2008 |

OTHER PUBLICATIONS

Hyunkee Min et al., "A New Timing Offset Estimation Algorithm Using Phase Difference Between Adjacent Subcarriers in Interleaved OFDMA Uplink Systems", IEEE WCNC 2007.*

H. Minn and V. K. Bhargava, "A Simple and Efficient Timing Offset Estimation for OFDM System", VTC_IEEE 2000.*

Il-Gu Lee et al., "High Accuracy and Low Complexity Timing Offset Estimation for MIMO-OFDM Receivers", IEEE WCNC 2006 Proceedings.*

* cited by examiner

PILOT-BASED TIME OFFSET ESTIMATION APPARATUS AND METHOD

CROSS-REFERENCE TO RELATED APPLICATIONS

This application is the national phase of PCT application PCT/CN2010/072926 having an international filing date of 19 May 2010, which claims benefit of Chinese application No. 200910151594.5 filed 3 Jul. 2009. The contents of the above patent applications are incorporated by reference herein in their entirety.

FIELD OF THE INVENTION

The present invention relates to the mobile communication field, in particular to a pilot-based timing offset estimation apparatus and method of an OFDM (orthogonal frequency division multiplexing) system in the mobile communication field.

BACKGROUND OF THE INVENTION

LTE (long term evolution) project, which is the biggest new technology research and development project initiated by the 3GPP ($3^{rd}$ Generation Partnership Project) in recent two years, improves and enhances the 3G air access technology. Compared with the 3G, the LTE has more technical advantages which are embodied in various aspects, such as higher user data rate, packet transfer, reduced system delay, improved system capacity and coverage, and reduced operating costs and so on.

The downlink of the LTE adopts the OFDM technology which has characteristics of high spectrum utilization rate and anti-multipath interference and so on. An OFDM system can effectively resist the influence brought by wireless channels. In general, an OFDM system is provided with a plurality of antennae and each antenna has a plurality of pilot positions. The uplink transmission solution of the LTE adopts an SC-FDMA (single carrier frequency division multiple access) system with a cyclic prefix. In the transmission solution of the SC-FDMA system with the cyclic prefix adopted for the uplink, a DFT (discrete Fourier transformation) is used to acquire a frequency-domain signal, then frequency spectrum shift is performed by inserting zero symbols (nil symbols) into the frequency-domain signal, and the signal after being shifted is processed through IFFT (inverse fast Fourier transformation) (therefore, the SC-FDMA system is also called as a DFT-S-OFDM (discrete Fourier transformation spread orthogonal frequency division multiplexing) system), so that the peak-to-average power ratio of a transmitting terminal can be reduced.

A symbol timing offset can result in a phase rotation in the frequency domain, and can accumulate the phase along with the frequency-domain symbols. The timing offset in the frequency domain can increase the sensitive degree of the OFDM to a time delay spread, with the result being that the tolerable time delay spread of the system will be lower than a designed value. In order to reduce this negative influence to the most extent, the timing offset needs to be decreased to the most extent. Therefore, the timing offset needs to be estimated, and further corrected.

The protocol 3GPP TS 36.213: "Evolved Universal Terrestrial Radio Access (E-UTRA); Physical layer procedures" provides relevant contents on how to align and report the timing offset (TA). According to a received uplink signal, a base station measures an uplink synchronization timing offset value of a UE (user equipment), and sends the timing offset alignment value (timing alignment, TA) down to the UE. Then the UE adjusts the uplink transmission timing of its own according to the received value to realize the uplink synchronization process. Therefore, the timing offset estimation is an indispensable part of the LTE system.

The symbol timing offset has a corresponding relation with sub-carrier phases. As the timing changes, corresponding changes happen to the symbol phases on the sub-carriers. The timing offset $t_0$ at a sample interval will generate the phase offset between two adjacent sub-carriers in the frequency domain as follows:

$$\varphi_0 = \frac{2\pi}{N} t_0.$$

Where N is the number of FFT (fast Fourier transformation) points corresponding to a system sampling frequency. The phase offset will accumulate linearly along with the increase of carrier distance, and can also generate a phase reversal when the accumulation comes to a certain extent.

The existing timing offset estimation technology is relatively sensitive to noises, can not provide good timing offset estimation performance under a low signal-to-noise ratio, and can not reduce the influence of the timing offset on the receiver performance.

SUMMARY OF THE PRESENT INVENTION

On the basis of the above-mentioned problems, in order to reduce the influence of the timing offset on the receiver performance, it is necessary to provide a simple apparatus which is easy to realize and can effectively perform the timing offset estimation. Therefore, the present invention puts forward a pilot-based timing offset estimation apparatus and method in an OFDM system to solve above-mentioned problems.

On one hand, the present invention aims to provide a pilot-based timing offset estimation apparatus of the OFDM system. The pilot-based timing offset estimation apparatus includes a pilot bit channel estimation module, configured to acquire pilot bit frequency-domain channel estimation values of target users through calculation on respective sub-carriers of the target users according to received frequency-domain demodulation reference symbols and local frequency-domain demodulation reference symbols; and a timing offset estimation module, configured to respectively perform timing offset estimation for each target user by using phase differences among the pilot bit frequency-domain channel estimation values on the respective sub-carriers.

On the other hand, the present invention aims to provide a pilot-based timing offset estimation method of the OFDM system. The method includes: acquiring pilot bit frequency-domain channel estimation values of target users through calculation on respective sub-carriers according to received frequency-domain demodulation reference symbols and local frequency-domain demodulation reference symbols; and respectively performing timing offset estimation for each target user by using phase differences among the pilot bit frequency-domain channel estimation values on the respective sub-carriers.

The pilot-based timing offset estimation apparatus performs the timing offset estimation for multiple users on the basis of the received pilot sequences; therefore provides more accurate measurement values for timing offset compensation and timing offset reporting, so as to reduce the influence of the timing offset on the receiver performance.

The pilot-based timing offset estimation method according to one aspect of the present invention can effectively estimate the relative timing offset between the base station and the terminal. Since the method of the separation of multiple users in the time domain and the noise reduction are adopted, this solution not only can perform the timing offset estimation for a single user, but also can perform the timing offset estimation for a plurality of MIMO (multiple-input multiple-output) users. Moreover, this solution has certain anti-noise abilities, and thus can acquire comparatively accurate estimation values even under a working point with low signal-to-noise ratio.

Other characteristics and advantages of the present invention will be described in the following specification and partly become obvious from the description, or be understood by implementing the present invention. The objects and other advantages can be realized and obtained through the structures specified by the specification, claims, and the drawings.

BRIEF DESCRIPTION OF THE DRAWINGS

The drawings provide a further understanding of the present invention and constitute a part of the application. The drawings and the embodiments of the present invention are given by way of illustration only, and are not intended to limit the present invention, wherein.

DETAILED DESCRIPTION OF THE EMBODIMENTS

General Description of Functions

In order to reduce the influence of timing offset on receiver performance, the present invention provides a pilot-based timing offset estimation apparatus. The apparatus includes a pilot bit channel estimation module which is used for acquiring pilot bit frequency-domain channel estimation values of target users through calculation on respective sub-carriers according to received frequency-domain demodulation reference symbols and local frequency-domain demodulation reference symbols; and a timing offset estimation module which is used for respectively performing timing offset estimation for each target user by using phase differences among the pilot bit channel estimation values on the respective sub-carriers.

What should be explained is that the embodiments of the present invention and the features therein can be combined with each other if there is no conflict. The present invention will be detailed hereinafter with reference to the drawings and in connection with the embodiments. What should be understood is that the preferable embodiments detailed hereafter are given by way of illustration only, and thus are not intended to limit the present invention.

Apparatus Embodiments

Figure 1:
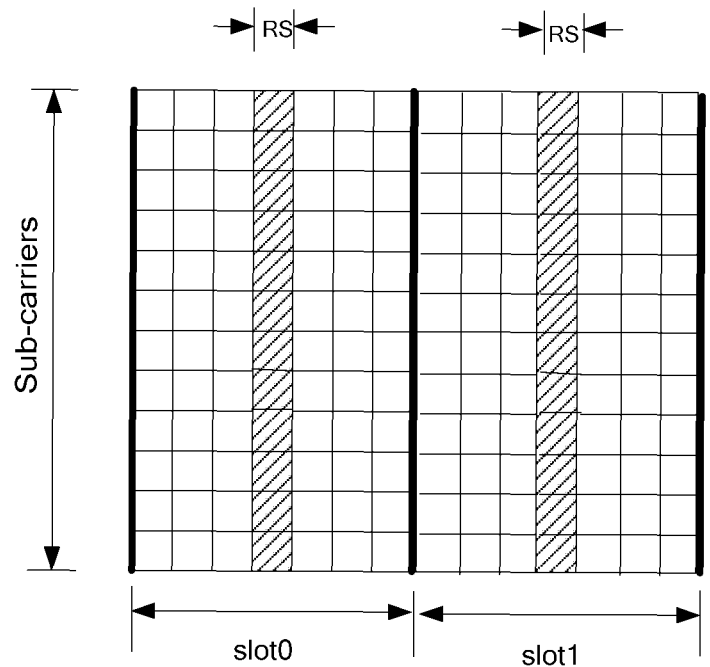
FIG. 1 is a schematic diagram of the positions of a pilot signal (PUSCH (physical uplink shared channel) channel demodulation reference signal) of the SC-FDMA system.
Figure 2:
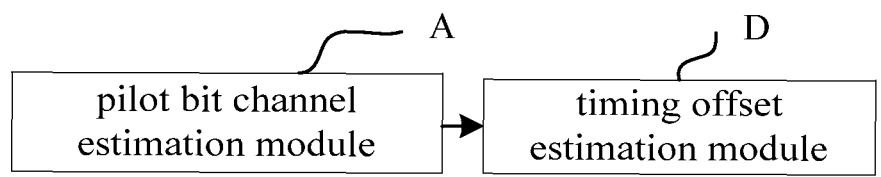
FIG. 2 is a schematic diagram of a timing offset estimation apparatus according to one embodiment of the present invention.

According to one embodiment of the present invention, as shown in FIG. 2, the pilot-based timing offset estimation apparatus includes a pilot bit channel estimation module A which is used for acquiring pilot bit frequency-domain channel estimation values of target users through calculation on respective sub-carriers according to received frequency-domain demodulation reference symbols and local frequency-domain demodulation reference symbols; and a timing offset estimation module D which is used for respectively performing timing offset estimation for each target user by using phase differences among the pilot bit channel estimation values on the respective sub-carriers.

In the embodiment, the timing offset estimation module D calculates the timing offset estimation value $t_{0,slot\_i,ka,(m)}$ at each pilot position on each receiving antenna according to the formula as follows:

$$t_{0,slot\_i,ka,(m)} = \frac{N}{2\pi} * \frac{1}{M-2} * \frac{1}{S} * \left( \sum_{k=1}^{M-S} \text{angle}(H_{k,slot\_i,ka,(m)} * conj(H_{k+S,slot\_i,ka,(m)})) \right).$$

Where m is a target user; slot_i is a time slot; ka is an antenna; M is the length of the frequency-domain channel estimation value; N is the number of points of an FFT; "angle ( )" is the angle function; "conj ( )" is the conjugate function; $H_{k,slot\_ka,(m)}$ is the frequency-domain channel estimation value of the $k^{th}$ sub-carrier; $H_{k+S,slot\_i,ka,(m)}$ is the frequency-domain channel estimation value of the k+s$^{th}$ sub-carrier; S is a carrier spacing factor which is an integer less than M-S. When a cell configuration is a normal cyclic prefix, S is selected to be 6 by default; and when a cell configuration is an extended cyclic prefix, S is selected to be 2 by default.

In the related art, the timing offset estimation is sensitive to noises, and thus can not provide good timing offset estimation performance under low signal-to-noise ratio. While the embodiment of the present invention performs the timing offset estimation for multiple users on the basis of the received pilot sequences, and therefore provides more accurate measurement values for timing offset compensation and timing offset reporting, so as to reduce the influence of the timing offset on the receiver performance.

Figure 3:
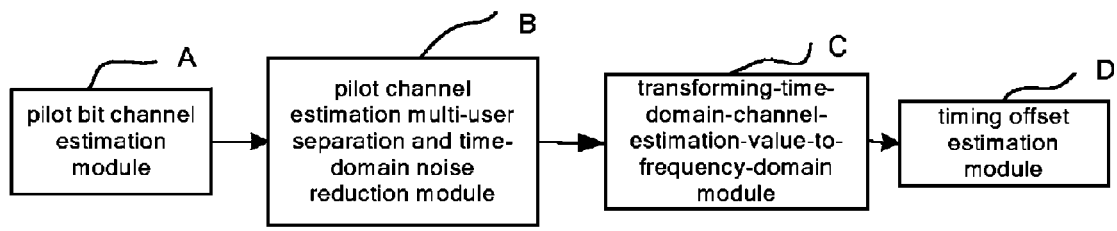
FIG. 3 is a schematic diagram of a timing offset estimation apparatus according to another embodiment of the present invention.

According to another embodiment of the present invention, as shown in FIG. 3, the pilot-based timing offset estimation apparatus of the OFDM system includes a pilot bit channel estimation module A, a pilot channel estimation multi-user separation and time-domain noise reduction module B, a transforming-time-domain-channel-estimation-value-to-frequency-domain module C, and a timing offset estimation module D which are connected in series.

In the above, the pilot bit channel estimation module A is used for acquiring pilot bit frequency-domain channel estimation values of the target users through calculation on respective sub-carriers according to received frequency-domain demodulation reference symbols and local frequency-domain demodulation reference symbols. The pilot channel estimation multi-user separation and time-domain noise reduction module B is used for performing multi-user separation and time-domain noise reduction to the pilot channel estimation. The transforming-time-domain-channel-estimation-value-to-frequency-domain module C is used for transforming time-domain channel estimation values obtained after the noise reduction performed by the time-domain noise reduction module to the frequency domain. The timing offset estimation module D is used for calculating the timing offset estimation values at respective pilot positions on respective receiving antennae by using the sub-carrier phase differences, and averaging a plurality of the timing offset estimation values at the pilot positions on the receiving antennae.

The pilot channel estimation multi-user separation and time-domain noise reduction module B can also include: a time-domain channel estimation value acquisition sub-module which is used for transforming the pilot bit frequency-domain channel estimation values acquired by the pilot bit channel estimation module to the time domain to acquire time-domain channel estimation values; an impulse response window length acquisition sub-module which is used for calculating the lengths of effective channel impulse response windows of the target users and separating the users; and a noise filtration sub-module which is used for filtering out noises outside the effective channel impulse response windows of the target users of each antenna by using the acquired time-domain channel estimation values and the lengths of the effective channel impulse response windows of the target users.

In the embodiment, in the impulse response window length acquisition sub-module, the length of the effective channel impulse response window $L_w$ of a target user is calculated according to the formula as follows:

$$L_c = \max\left(\left\lfloor M * \frac{l_{CP}}{2048} \right\rfloor, 1\right).$$

Where the length of the effective channel impulse response window $L_w$ includes a fore-window length and a post-window length, the fore-window length is $L_{fore}=\lambda_f L_c$ and the post-window length is $L_{post}=\lambda_p L_c$, then $L_w=L_{fore}+L_{post}$; M is the length of the frequency-domain channel estimation value; $\lambda_f$ and $\lambda_p$ are window width adjusting factors; "$\lfloor \ \rfloor$" means the floor function; $l_{cp}$, means the length of a cyclic prefix (CP); and $L_c$ is a calculated window length parameter corresponding to the CP.

In the embodiment, since the method of multi-user separation and noise reduction in the time domain is adopted, this solution not only can perform the timing offset estimation for a single user, but also can perform the timing offset estimation for a plurality of MIMO (multiple-input multiple-output) users. Moreover, this solution has certain anti-noise abilities, and thus can acquire comparatively accurate estimation values even under working points with low signal-to-noise ratio.

Method Embodiments

Figure 4:
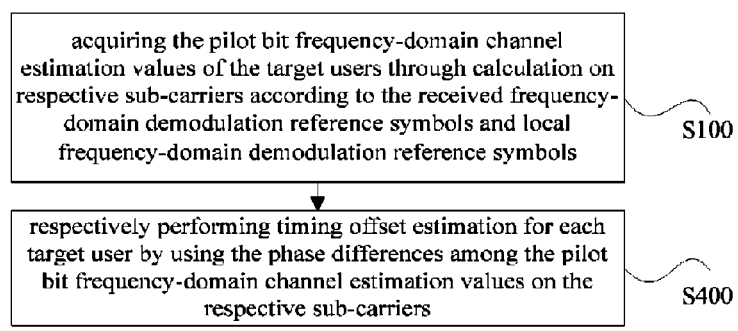
FIG. 4 is a flowchart of a timing offset estimation method according to one embodiment of the present invention.

According to another aspect of the present invention, as shown in FIG. 4, the pilot-based timing offset estimation method of the present invention includes:

Step S100, acquiring pilot bit frequency-domain channel estimation values of target users through calculation on respective sub-carriers according to received frequency-domain demodulation reference symbols and local frequency-domain demodulation reference symbols; and Step S400, respectively performing timing offset estimation for each target user by using phase differences among the pilot bit frequency-domain channel estimation values on the respective sub-carriers.

Preferably, Step S400 can also include:

Step S401, when the frequency-domain channel estimation values of a user m have been acquired, for the target user m, the phase differences among the frequency-domain channel estimation values on respective sub-carriers are used to perform the timing offset estimation. The timing offset value at each pilot position on each receiving antenna can be calculated according to the formula as follows:

$$t_{0,slot\_i,ka,(m)} = \frac{N}{2\pi} * \frac{1}{M-S} * \frac{1}{S} * \left(\sum_{k=1}^{M-S} \text{angle}(H_{k,slot\_i,ka,(m)} * conj(H_{k+S,slot\_i,ka,(m)}))\right).$$

Where M is the length of the frequency-domain channel estimation value; N is the number of points of the FFT (20M→2048); "angle ( )" is an angle function (unit: radian); "conj ( )" is a conjugate function; $H_{k,slot\_i,ka,(m)}$ is the frequency-domain channel estimation value of the $k^{th}$ sub-carrier; $H_{k+S,slot\_i,ka,(m)}$ is the frequency-domain channel estimation value of the $k+s^{th}$ sub-carrier; S is the carrier spacing factor which is an integer less than M-S. When the cell configuration is a normal CP (cyclic prefix), S is selected to be 6 by default; and when the cell configuration is an extended CP, S is selected to be 2 by default. The unit of the timing offset estimation value $t_{0,slot\_i,ka,(m)}$ is Ts.

Step S402, a plurality of the timing offset estimation values at the pilot positions on the receiving antennae are averaged. The timing offset estimation value $\bar{t}_0$ of a current subframe is acquired by averaging the respectively calculated timing offset estimation values $t_0$ of two pilots and then averaging the timing offset estimation values for the receiving antennae according the following formula, $$\bar{t}_0 = \sum_{ka=1}^{Ka} \sum_{slot=1}^{2} (t_{0,ka,slot}).$$

The estimated $\bar{t}_0$ can be used to perform timing offset compensation, or can be reported to an MAC (medium access control) layer, so that the MAC layer can notify the UE to perform timing alignment.

The embodiment performs the timing offset estimation for multiple users on the basis of the received pilot sequences, provides more accurate measurement values for the timing offset compensation and timing offset reporting, and thus can reduce the influence of the timing offset on the receiver performance.

Figure 5:
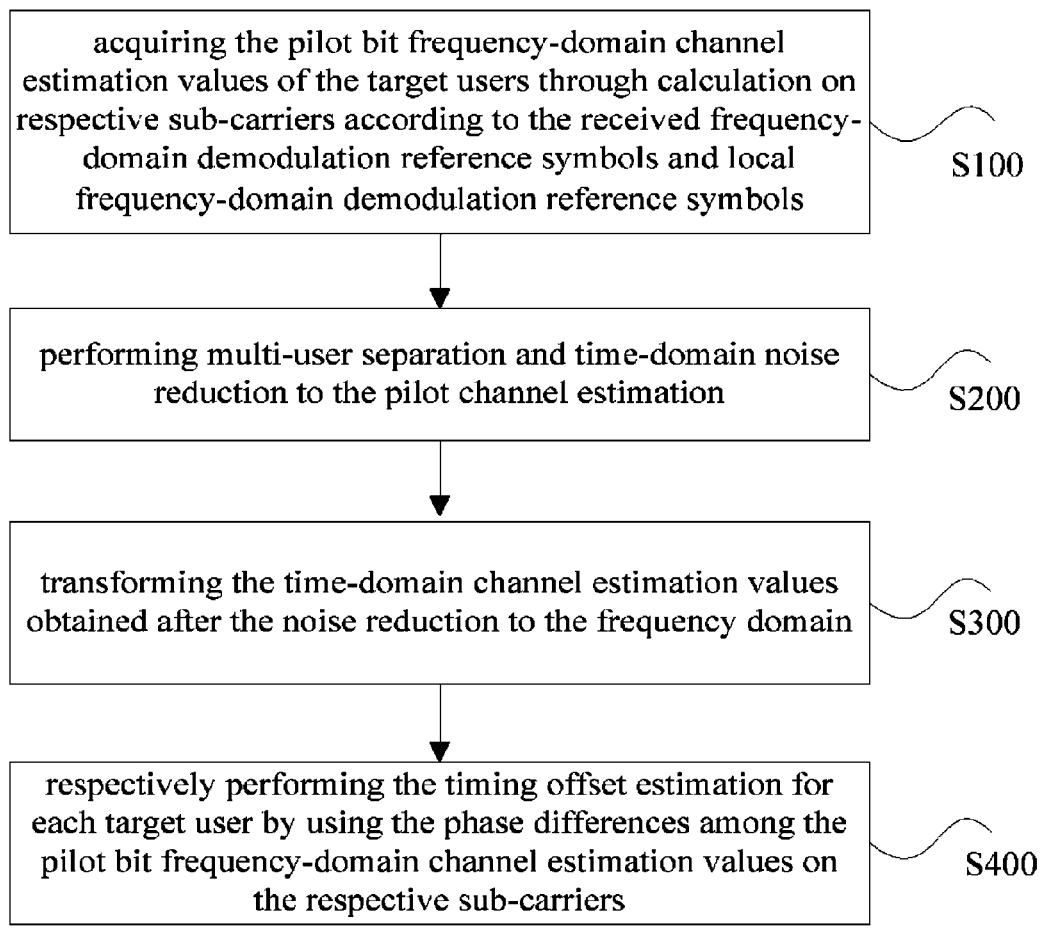
FIG. 5 is a flowchart of a timing offset estimation method according to another embodiment of the present invention.

The implementation of the technical solution according to another embodiment of the present invention will be further detailed hereafter in connection with FIG. 5. What should be understood is that the preferable embodiment detailed hereinafter are given by way of illustration only, and thus are not intended to limit the present invention.

Step S100, acquiring pilot bit frequency-domain channel estimation values of target users through calculation according to received frequency-domain demodulation reference symbols and local frequency-domain demodulation reference symbols; on a time slot slot_i and an antenna ka, if a received frequency-domain sequence is $Y_{k,slot\_i,ka}$ and a local frequency-domain pilot position is $X_k$, then the channel estimation $H_{k,slot\_i,ka}$ is calculated according to the formula as follows:

$$H_{k,slot\_i,ka} = \frac{Y_{k,slot\_i,ka}}{X_k} = a_{k,slot\_i,ka}e^{j\phi_{k,slot\_i,ka}}, 1 \le k \le M.$$

Step S200, performing multi-user separation and time-domain noise reduction on the pilot channel estimation.

Step S200 further includes:

Step S201, transforming the frequency-domain channel estimation to the time domain through IDFT (inverse discrete Fourier transformation):

$$h(n)=\text{IDFT}(H(k)).$$

Step S202, calculating the lengths of the effective channel impulse response windows $L_w$ for the target users.

$$L_c = \max\left(\left\lfloor M * \frac{l_{CP}}{2048}\right\rfloor, 1\right),$$

where "$\lfloor\ \rfloor$" means the floor function; $l_{cp}$ means the length of the cyclic prefix; and Lc is the calculated window length parameter corresponding to the CP; and M is the length of a frequency-domain channel estimation value.

The lengths of the effective channel impulse response window $L_w$ include a fore-window length and a post-window length; wherein the fore-window length is $L_{fore}=\lambda_f L_c$ and the post-window length is $L_{post}=\lambda_p L_c$. $\lambda_f$ and $\lambda_p$ are window width adjusting factors which can be acquired through simulation or test.

$$L_w = L_{fore} + L_{post}.$$

Supposing that the number of the users is K_User and there exists channel estimation for a plurality of users on the time domain sequence h(n), for the user m, the left and right windows with ($L_{fore}+L_{post}$) sampling points are the effective channel impulse response $$Index_{(m)} = \frac{\alpha_{(m)} * M}{2\pi}$$

window of the user m, which start from the cyclic shift number of the user m relative to the parent code, wherein $\alpha_{(m)}$ means the cyclic shift of the $m^{th}$ user.

Step S203, filtering out the noises outside the window of each antenna.

$$\tilde{h}_{(m)}(n) = \begin{cases} h(n) & \text{taps inside window of user } m \\ 0 & \text{taps outside window of user } m. \end{cases}$$

After Step S200, the method also includes:

Step S300, transforming the time-domain channel estimation values obtained after the noise reduction to the frequency domain, $H_{(m)}(k)=\text{DFT}(\tilde{h}_{(m)}(n))$, $1 \le m \le K\_User$;

Step S400, respectively performing timing offset estimation for each target user by using the phase differences among the pilot bit frequency-domain channel estimation values on respective sub-carriers.

In the above, Step S400 further includes the steps as follows.

Step S401, performing timing offset estimation for the target user m by using the channel estimation values on respective sub-carriers; respectively calculating the timing offset value at each pilot position on each receiving antenna, $$t_{0,slot\_i,ka,(m)} = \frac{N}{2\pi} * \frac{1}{M-S} * \frac{1}{S} * \left(\sum_{k=1}^{M-S} \text{angle}(H_{k,slot\_i,ka,(m)} * conj(H_{k+S,slot\_i,ka,(m)}))\right),$$

where M is the length of the frequency-domain channel estimation value; N is the number of points of the FFT (20M→2048); "angle ( )" is the angle function (unit: radian); "conj ( )" is the conjugate function; $H_{k,slot\_i,ka,(m)}$ is the frequency-domain channel estimation value of the $k^{th}$ sub-carrier; $H_{k+S,slot\_i,ka,(m)}$ is the frequency-domain channel estimation value of the $k+s^{th}$ sub-carrier; S is the carrier spacing factor which is an integer less than M-S. When the cell configuration is a normal CP (cyclic prefix), S is selected to be 6 by default; and when the cell configuration is an extended CP, S is selected to be 2 by default.

Step S402, averaging the timing offset estimation values at a plurality of pilot positions on a plurality of receiving antennae. The timing offset estimation values $t_0$ of two pilots respectively calculated are averaged; then the timing offset estimation values of the receiving antennae are averaged, so that the timing offset estimation value $\bar{t}_0$ of a current subframe is acquired, $$\bar{t}_0 = \sum_{ka=1}^{Ka} \sum_{slot=1}^{2} (t_{0,ka,slot}).$$

The unit of the estimated timing offset estimation values $t_{0,slot\_i,ka,(m)}$ and $\bar{t}_0$ are both Ts (1 Ts=1/30720 ms). The estimated $\bar{t}_0$ can be used to perform timing offset compensation, or can be used to generate a synchronization command word which is then reported to an MAC layer, so that the MAC layer can notify the UE to perform timing adjustment to realize uplink synchronization.

All in all, in virtue of the embodiments of the present invention, the influence of the timing offset on the receiver performance is reduced through performing timing offset estimation to the acquired pilot bit frequency-domain channel estimation values. Besides, the timing offset estimation method according to one aspect of the present invention can effectively estimate the relative timing offset between the base station and the terminal. Since the methods of the separation of multiple users in the time domain and the noise reduction are adopted, the solution not only can perform timing offset estimation for a single user, but also can perform timing offset estimation for a plurality of MIMO users. Moreover, this solution has certain anti-noise ability, and thus can acquire comparatively accurate estimation values even under the working point with low signal-to-noise ratio.

The present invention is suitable for the OFDM system. Any engineer with knowledge backgrounds of signal processing, communication etc. can design relevant apparatuses according to the present invention. Any amendments, equivalent substitutions, improvements etc. within the spirit and principle of the present invention are all concluded in the concept and protection scope of the present invention.

The invention claimed is:

1. A pilot-based timing offset estimation apparatus, comprising:
   a pilot bit channel estimation module, configured to acquire pilot bit frequency-domain channel estimation values of target users through calculation on respective sub-carriers of the target users according to received frequency-domain demodulation reference symbols and local frequency-domain demodulation reference symbols; and a timing offset estimation module, configured to respectively perform timing offset estimation for each target user by using phase differences among the pilot bit frequency-domain channel estimation values on the respective sub-carriers;

wherein the timing offset estimation module calculates timing offset estimation values at respective pilot positions on respective receiving antennae by using the phase differences among the acquired pilot bit frequency-domain channel estimation values;

wherein the timing offset estimation module averages a plurality of the timing offset estimation values at the pilot positions on the receiving antennae acquired through calculation;

wherein the timing offset estimation module calculates the timing offset estimation value $t_{0,slot\_i,ka,(m)}$ of a time slot slot_i of a $k^{th}$ sub-carrier of an $m^{th}$ user of a $ka^{th}$ antenna according to the formula as follows:

$$t_{0,slot\_i,ka,(m)} = \frac{N}{2\pi} * \frac{1}{M-S} * \frac{1}{S} * \left( \sum_{k=1}^{M-S} \text{angle}(H_{k,slot\_i,ka,(m)} * conj(H_{k+S,slot\_i,ka,(m)})) \right)$$

where M is a length of a frequency-domain channel estimation value; N is the number of points of a Fast Fourier Transform (FFT); S is a carrier spacing factor which is an integer less than M-S, and when a cell configuration is a normal cyclic prefix, S is selected to be a first value by default, and when a cell configuration is an extended cyclic prefix, S is selected to be a second value by default; "angle ( )" is an angle function; "conj( )" is a conjugate function; $H_{k,slot\_i,ka,(m)}$ is a frequency-domain channel estimation value of the time slot slot_i of the $k^{th}$ sub-carrier of the $m^{th}$ user of the $ka^{th}$ antenna; and $H_{k+S,slot\_i,ka,(m)}$ is a frequency-domain channel estimation value of the time slot slot_i of the $k+s^{th}$ sub-carrier of the $m^{th}$ user of the $ka^{th}$ antenna.

2. The pilot-based timing offset estimation apparatus according to claim 1, wherein the apparatus further comprises:

a pilot channel estimation multi-user separation and time-domain noise reduction module, configured to perform multi-user separation and time-domain noise reduction on pilot channel estimation to obtain time-domain channel estimation values; and a transforming-time-domain-channel-estimation-value-to-frequency-domain module, configured to transform the time-domain channel estimation values obtained after the noise reduction performed by the pilot channel estimation multi-user separation and time-domain noise reduction module to the frequency domain.

3. The pilot-based timing offset estimation apparatus according to claim 2, wherein the pilot channel estimation multi-user separation and time-domain noise reduction module further comprises:

a time-domain channel estimation value acquisition sub-module, configured to acquire the time-domain channel estimation values by transforming the pilot bit frequency-domain channel estimation values acquired by the pilot bit channel estimation module to the time domain;

an impulse response window length acquisition sub-module, configured to calculate lengths of effective channel impulse response windows of the target users and separate the target users; and a noise filtration sub-module, configured to filter out noises which are outside the effective channel impulse response windows of the target users of each antenna according to the acquired time-domain channel estimation values and the effective channel impulse response windows of the target users.

4. The pilot-based timing offset estimation apparatus according to claim 2, wherein in the impulse response window length acquisition sub-module, the length of the effective channel impulse response window $L_w$ of a target user is calculated according to the formula as follows:

$$L_c = \max\left(\left\lfloor M * \frac{l_{CP}}{2048} \right\rfloor, 1\right),$$

where the length of the effective channel impulse response window $L_w$ comprises a fore-window length and a post-window length, the fore-window length is $L_{fore}=\lambda_f L_c$ and the post-window length is $L_{post}=\lambda_p L_c$, then $L_w=L_{fore}+L_{post}$;

where M is the length of the frequency-domain channel estimation value; $o_f$ and $\lambda_p$ are window width adjusting factors; "$\lfloor \ \rfloor$" means a floor function; $l_{cp}$ means a length of a cyclic prefix (CP); and $L_c$ is a calculated window length parameter corresponding to the CP.

5. A pilot-based timing offset estimation method, comprising:

acquiring pilot bit frequency-domain channel estimation values of target users through calculation on respective sub-carriers according to received frequency-domain demodulation reference symbols and local frequency-domain demodulation reference symbols; and respectively performing timing offset estimation for each target user by using phase differences among the pilot bit frequency-domain channel estimation values on the respective sub-carriers;

wherein the step of respectively performing timing offset estimation for each target user by using phase differences among the pilot bit frequency-domain channel estimation values on the respective sub-carriers comprises: calculating timing offset estimation values at respective pilot positions on respective receiving antennae by using the phase differences on the respective sub-carriers;

wherein the timing offset estimation value $t_{0,slot\_i,ka,(m)}$ of a time slot slot_i of a $k^{th}$ sub-carrier of an $m^{th}$ user of a $ka^{th}$ antenna is calculated according to the formula as follows:

$$t_{0,slot\_i,ka,(m)} = \frac{N}{2\pi} * \frac{1}{M-S} * \frac{1}{S} * \left( \sum_{k=1}^{M-S} \text{angle}(H_{k,slot\_i,ka,(m)} * conj(H_{k+S,slot\_i,ka,(m)})) \right)$$

where M is a length of a frequency-domain channel estimation value; N is the number of points of a Fast Fourier Transform (FFT); S is a carrier spacing factor which is an integer less than M-S, and when a cell configuration is a normal cyclic prefix, S is selected to be a first value by default, and when a cell configuration is an extended cyclic prefix, S is selected to be a second value by default; "angle ( )" is an angle function; "conj ( )" is a conjugate function; $H_{k,slot\_i,ka,(m)}$ is a frequency-domain channel estimation value of the time slot slot_i of the $k^{th}$ sub-carrier of the $m^{th}$ user of the $ka^{th}$ antenna; and $H_{k+S,slot\_i,ka,(m)}$ is a frequency-domain channel estimation value of the time slot slot_i of the $k+s^{th}$ sub-carrier of the $m^{th}$ user of the $ka^{th}$ antenna.

6. The pilot-based timing offset estimation method according to claim 5, wherein the step of respectively performing timing offset estimation for each target user by using phase differences among the pilot bit frequency-domain channel estimation values on the respective sub-carriers further comprises: averaging a plurality of the timing offset estimation values at the pilot positions on the receiving antennae acquired through calculation.

7. The pilot-based timing offset estimation method according to claim 5, wherein before the step of respectively performing timing offset estimation for each target user by using phase differences among the pilot bit frequency-domain channel estimation values on the respective sub-carriers, the method further comprises:
performing multi-user separation and time-domain noise reduction on pilot channel estimation to obtain time-domain channel estimation values; and
transforming the time-domain channel estimation values obtained after the noise reduction performed by a time-domain noise reduction module to the frequency domain.

8. The pilot-based timing offset estimation method according to claim 7, wherein the step of performing multi-user separation and time-domain noise reduction to pilot channel estimation comprises:
acquiring the time-domain channel estimation values by transforming the pilot bit frequency-domain channel estimation values acquired by a pilot bit channel estimation module to the time domain;
calculating lengths of effective channel impulse response windows of the target users and separating the target users; and
filtering out noises which are outside the effective channel impulse response windows of the target users of each antenna according to the acquired time-domain channel estimation values and the effective channel impulse response windows of the target users.

9. The pilot-based timing offset estimation method according to claim 7, wherein the length of the effective channel impulse response window length $L_w$ of a target user is calculated according to the formula as follows:

$$L_c = \max\left(\left\lfloor M * \frac{l_{CP}}{2048} \right\rfloor, 1\right),$$

where the length of the effective channel impulse response window length $L_w$ comprises a fore-window length and a post-window length, the fore-window length is $L_{fore}=\lambda_f L_c$ and the post-window length is $L_{post}=\lambda_p L_c$, then $L_w=L_{fore}+L_{post}$;
wherein, M is the length of the frequency-domain channel estimation value; $\lambda_f$ and $\lambda_p$ are window width adjusting factors; "$\lfloor \ \rfloor$" means the floor function; $l_{cp}$ means the length of the cyclic prefix (CP); and $L_c$ is the calculated window length parameter corresponding to the CP.

* * * * *